DIGITAL-TO-ANALOG CONVERTER WITH SMOOTH RECOVERY

Filed Aug. 8, 1966

INVENTOR
David H. Hartke
By Smyth, Roston & Pavitt
ATTORNEYS

United States Patent Office 3,555,540
Patented Jan. 12, 1971

1 2

3,555,540
DIGITAL-TO-ANALOG CONVERTER WITH SMOOTH RECOVERY

David Henry Hartke, Glendora, Calif., assignor to SDS Data Systems, Pomona, Calif., a corporation of California Filed Aug. 8, 1966, Ser. No. 570,861
Int. Cl. H03k *13/04;* G06g *7/28*
U.S. Cl. 340—347 20 Claims

ABSTRACT OF THE DISCLOSURE

A floating point number digital-to-analog converter is disclosed in which he sequential mantissas are converted and exponent changes signalling mantissa jumps are used to multiply or divide the mantissas to eliminate discontinuities. Subsequently the analog output is expanded or compressed by gradual gain change in the analog output. When a gain change limit has been reached, the gain is step-function changed in the reverse, concurring with a digital arithmetic step eliminating the previous one which occurred when there was an exponent change. The gradual gain change is controlled by separate feedback through a fine resolution counter. As the gradual gain change is relatively slow, sudden signal "burst-outs" are not eliminated. The digital signal may be a multiplexed one, with demultiplexing occurring at the analog output.

Figures 1, 2:
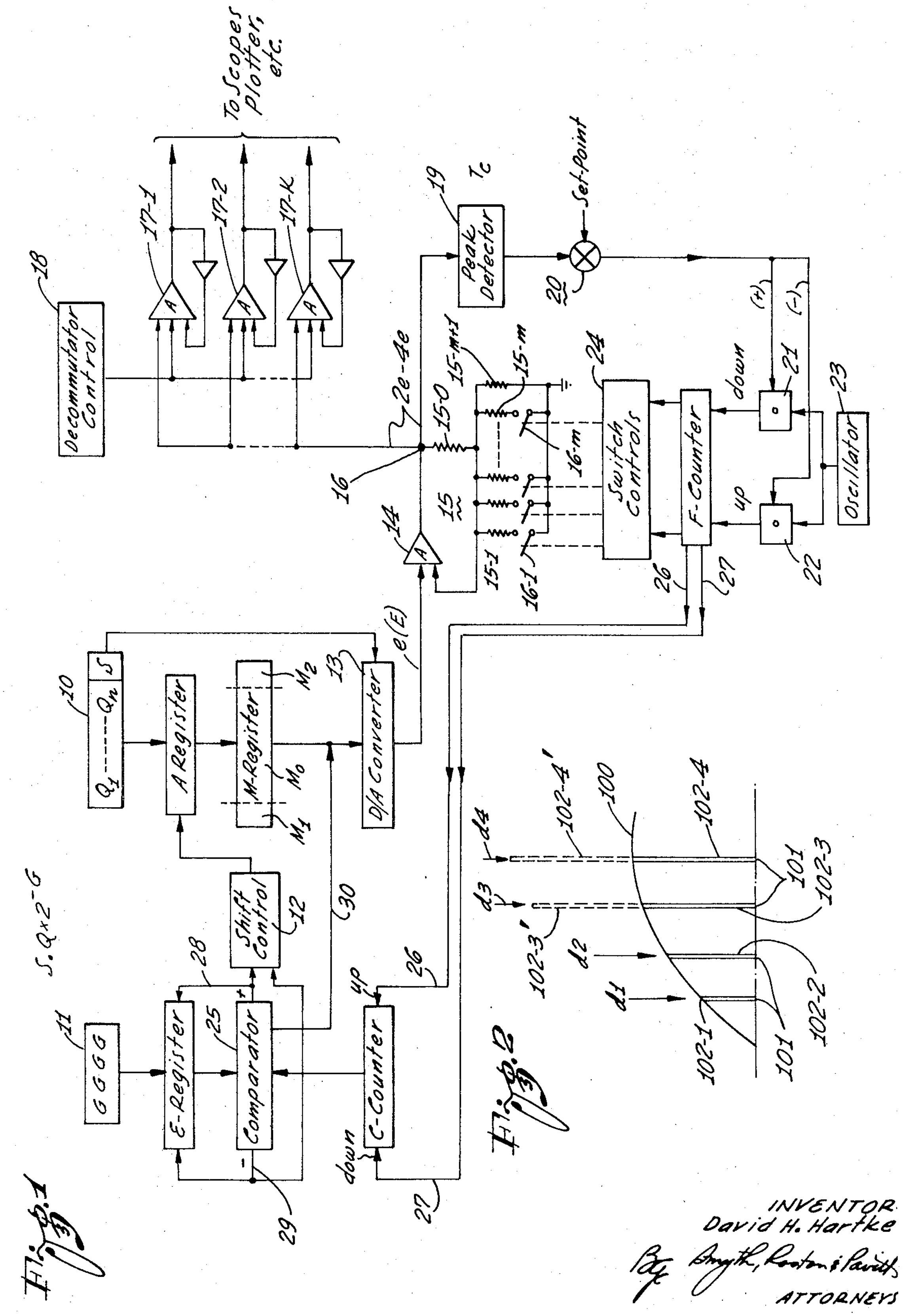

The present invention relates to a digital-to-analog signal converting system wherein the digital signals are represented in floating point notation. The representation of numbers in a floating point format is used always in those cases in which the values of the numbers to be represented may vary over a very large range, but wherein for each individual number the full range is not needed.

Take, for example, a decimal number covering, for example, up to ten decimal digit positions; such a number can be represented in a binary format of about thirty-one binary bits. If one considers this to be a fixed format then not all numbers which have to be processed, evaluated, etc., will require really thirty-one bits for representation. Depending on any particular number represented in this format, the highest bit of a particular number having the value 1 will in many cases not be the most significant bit of the thirty-one bit format. For example, the decimal number $10^4$ requires only fourteen binary bits and all seventeen higher valued bit positions hold zero bits.

On the other hand, a number having the numerical value in the upper range being, for example, in the order $10^9$; here it may not be required to know the exact value of the number down to the lowest binary position. Instead, say only the upper seven or ten, of fifteen bit positions may be of interest as the case may be. Still lower bit positions will have no significance any more for the problem and its solution to which the number pertains. For example, if the digital numbers are to be converted into analog signals to be plotted or otherwise displayed, the problem may have only resolution capabilities corresponding to a binary range of $2^9$:1. It is obvious, that for such a number only the nine most significant bits are useful, bits of lesser significance can be dropped. The floating point notation of a number provides for a convenient way of expressing the number in a given format of resolution, using for example fifteen binary bits covering a range of about five decimal positions. Should the numbers themselves vary over a range of thirty-one binary bit positions, only fifteen bits thereof are regarded as being of significance at all times, then one needs a scaling factor for this number which is to be a power of 2 in case one uses binary expansion, having an exponent which in this case may be expressible itself by four bits. Thus, in this chosen format a number requiring thirty-one bits for full development may be represented by a fifteen bit mantissa multiplied by a scaling factor which is a power of 2 and the exponent thereof is a four bit number. Thus, the entire number could now be expressed in only nineteen bits.

It is important now that any particular number can be expressed in this manner in different ways, if one can postulate that not always fifteen full mantissa bits are in fact needed, but less may be possible so that the fifteen mantissa bits may, for example, already define a number of higher resolution than is actually needed. For example, if sequentially provided digital signals represent signals sampled from a sinusoidal analog signal with the sampling rate being much higher than the oscillating period, here then the maximum amplitude of this sinusoidal signal may be expressed on a given scale and with a given degree of accuracy, for example, fourteen bits, which means that in the fifteen bit mantissa format only the second highest bit may have the value 1. The exponent or scaling factor may have any value having to do, for example, with the interpretation of the number within chosen dimensions. It follows that amplitude values of the sine wave below maximum or peak value will be expressed by less than fourteen bits. It may not be reasonable to express the different amplitudes with a different degree of accuracy near the zero crossing than near the maximum thereof.

For any such digital number having bits less than the chosen maximum mantissa format, it is possible to express the same number by shifting the mantissa bits to position of higher or lower significance while reducing or increasing the exponent by 1 per mantissa shifting step; bearing in mind that shifting of a binary number is the equivalent of multiplication or division by "two," depending upon the direction of shifting. Such transformation does not change the value of the number. As stated, a given sinusoidal analog signal when digitized will be expressed digitally with the same resolution, that is to say the accuracy as represented by the value of the least significant bit used will not change in digitizing the maximum amplitude value or an amplitude value near the zero crossing. On the other hand, the envelope of a long train of such sine waves being defined by all maximum amplitudes, may undergo significant changes over the period of processing.

For example, if an exploratory charge is detonated in the ground for seismic explorations, vibration signals are picked up by a geophone, and the envelope of the signals may vary, for example, over 80 db from the time the geophone receives the first signal up to the time only background noise is picked up or the signal loses any significance for explorations. It should be mentioned that all numbers given here for the number of bits, etc., are chosen only as representative examples and for present day seismic exploration and have no limiting significance for practicing this invention.

Considering now that a 6 db signal variation is approximately equal to a halving or doubling of the value of the signal, one can see that this envelope variation covers about thirteen binary notation, i.e., the amplitude range of the envelope is for example $2^{13}$:1. On the other hand, each oscillation itself requires for evaluation, about the same number of bits, regardless of whether it is the first wave received by the geophone or the last one processed before termination of the test run. This is particularly so, if one considers that each oscillation as received needs to be represented only at an accuracy which is a given fraction of the peak amplitude regardless of the absolute value thereof. This is only a different way of saying that each amplitude value can be expressed by a fixed number of bits representing the resolution of each wave itself regardless of the absolute value of the peak amplitude, times a scaling factor which may vary in accordance with the range over which the peaks of the sine waves may change.

The entire sinusoidal, analog wave train may be digitally represented by digital numbers each having a mantissa the number of bits thereof representing the resolution of each oscillation for example, fifteen bits. Each digital number will also have a scaling factor for the base of 2 with an exponent having four bits which will be sufficient to cover a scale range now of $2^{16}:1$. A digitizing system of this type is disclosed in copending application of common assignee, S.N. 537,386 filed Mar. 25, 1966. Whenever in the following reference is made to a digitizer forming a floating point number, it is understood that a unit disclosed in this copending application may be used.

It can thus be seen that instead of using thirty-one bits for each digital number representing an instantaneous value of such analog signal, only nineteen bits are needed: fifteen mantissa bits and four exponent bits, and this representation fully expresses the seismic signals at the desired degree of accuracy. Having digitized an analog signal in this manner and assuming now for convenience a rather high sampling rate, one can see that a reconstruction of the analog signal out of the digital signal produces the following problem:

Take the mantissas of a sequence of digital data having the same exponent. If one merely plots the mantissas, a smooth curve representing the original analog signal can readily be interpolated which is readily performed by a digital-to-analog converter, or in a plotter, oscilloscope, etc., as long as the scaling factor does not change. Now one must consider again the purpose of expressing originally the analog information in digital floating point notation. For the particular case of seismic signals the initial signals received will be strong, which is to say that the exponent of the floating point number is rather high, and the first signals will be digitized, i.e., the mantissas will be formed while that particular exponent remains constant for a while.

As time progresses the envelope of the seismic signals will decline and the oscillations as received will on the average have a lesser amplitude, and this is being sensed in the digitizer. At a particular point in time occurring in between two sequentially produced digital signals, the digitizer will "decide" that the sale has to be reduced in order not to lose information because for that particular chosen initial exponent, the amplitude values have begun to drop severely below what could be expressed by a fifteen bit mantissa, which means loss of information. This means that from now on the absolute accuracy is in fact to be increased in order to maintain the relative accuracy for each wave, and for that it becomes necessary to consider also signal increments having half the absolute value as was previously done: Since the mantissa format is given and fixed, all signal increments originally having the value of unity (lowest bit) should have from now the value 2 etc.; in order to maintain consistency, the exponent of the scaling factor is to be reduced by 1.

A digital number formed after this change in scaling has been performed, has a mantissa appearing to be shifted to the left as compared with the position it would have, had the change in scaling not occurred. Also, the exponent was reduced by 1. If now a mantissa of a digital number produced before the scale change occurred is plotted next to the mantissa of the next digital number produced after the scale change, a smooth interpolation is not possible, as now suddenly that mantissa has twice the value it would have, had the scale change not occurred. Thus upon plotting all of the mantissa values as analog values in an attempt to reconstruct the original analog signal, a jump or discontinuity would occur each time the scaling was changed.

In order to prevent such discontinuities from appearing, the full number would have to be reconstructed, i.e., all mantissas would have to be shifted back again corresponding to an equalization of all exponents. After such shift, all mantissas could be digital-to-analog converted and a smooth curve would result. This however would require an analog signal range of $2^{31}:1$ or about $10^{10}:1$. Aside from the gross impracticality of such analog signal reconstruction, evaluation of a plot of such signal would be exceedingly cumbersome and close to impossible.

It is now the principal object of the present invention to permit analog signal reproduction and display or plotting or the like on a much reduced and compressed scale, comparable with the scale compression chosen for the mantissas throughout the run, or even less, but without producing jumps in the plot where the digitizer had caused and produced a scaling change. The signal compression or expansion, depending upon which direction scaling was changed in the digitizer, is carried out in the inventive digital-to-analog conversion system in a manner that the relative accuracy referenced against the envelope is to be maintained and to be constant as much as possible. This means that the reproduced analog signal will have a substantially constant envelope, and the individual waves have no discontinuities.

It is of particular importance that for example for evaluation of seismic signals as to particular aspects, the exact waveform of any oscillatory component is of secondary importance. More important is its phase. Furthermore for such explorations usually one uses a large number of differently placed geophones, each producing a signal train of the character described, and the phase relationship of the oscillations in the several trains are of great interest. The mantissas of the several reconstructed analog signals are plotted after digital-to-analog conversion without regard to the exponents, the display must be on a compressed scale in order to permit convenient comparison of the several reconstructed trains. Jumps in each reconstructed analog signal train wherever at points in time, when scaling was changed, materially impedes the detection of phase relationships among the several analog signal trains.

In accordance with the invention these jumps and discontinuities in the analog values of the mantissa signals are eliminated, and the scaling change, though basically retained, is very finely divided into very small scaling change steps and timely distributed over a relatively long period, but less than the average period in between two normally expected scale jumps. This results in some waveform distortions, but if a 2:1 scale factor jump can be distributed to the extent that the corresponding 6 db signal change occurs gradually over at least one normally expected signal oscillation period or even longer, then any distortion is noticeable only very little, and the phase relationship of the signals are more readily readable from the several plotted analog signals.

Briefly speaking, the invention accomplishes these objectives by converting the mantissa as sequentially provided and pertaining to different digital signals, into an analog signal train and subjecting the analog signals to variable gain amplification. The gain here can vary gradually over a total range equal to one step of mantissa shifting, that is to say, when the gain is changed from its lowest to its highest value or reverse, the output of the amplifier is doubled (or halved) which is the same result as if the mantissa had been multiplied (or divided) by "two" by being shifted by one step to the left (right). The gain of the amplifier can be adjusted within the range in sequentially occurring fine steps not noticeable as discontinuities in the analog output of the amplifier. However, the gain of the amplifier can be dropped by a single step from the highest to the lowest value and if concurrently thereto the mantissa as a whole before being applied to the digital-to-analog converter is in fact shifted by one position to the left the output of the amplifier will not change. Conversely, if the gain of the amplifier jumps from the lowest to the highest value one single step and if concurrently the mantissa is shifted to the right, again no jump or discontinuity in the analog output signal of the amplifier will occur.

One can see that the analog signal can thus be varied in fine steps by a gradual change in gain of the amplifier, and by coupling gain change jumps with a mantissa shift, this fine gain adjustment is operative as a gradual analog signal change over the entire amplitude range of the system. The fine gain control of the amplifier connected to the output side of the digital-to-analog converter is to be controlled by a feedback loop sensing the average peak output of the variable gain amplifier and referencing it against an adjustable D.C. type signal. There will result an error signal being either positive or negative. This error signal will vary in time because the amplifier output is an A.C. type signal. The error signal now controls a bidirectional counter which in turn sets the gain of the amplifier. When the counter has covered its full range in upward direction it recycles which produces a gain jump in the amplifier, and the jump is used to shift the mantissa so that the analog output remains without discontinuity. The exponent which accompanies a mantissa also controls shifting thereof, so that the mantissas as sequentially applied to the digital-to-analog converter exhibit no discontinuities in the analog signal reconstructed from the sequential mantissas. This way the reconstructed analog signal can be varied so that any scale factor as much as the jumps in the digitized signal are smoothed out.

Thus, the philosophy behind the invention is a digital control by selective multiplication and division of the mantissas before digital-to-analog conversion to eliminate discontinuities, while a graduated gain control tends to maintain the envelope of the analog output at a constant level. This latter control involves the analog output channel by fine gain adjustment, and it involves the digital input of the digital-to-analog converter for coarse gain control but without discontinuities, as for each coarse adjustment of the gain at the said digital input side, there is an opposite but equal gain jump due to recycling of the fine gain control in the analog side.

The digital signals as sequentially provided may pertain to different original inputs, such as several geophones, so that the digital signals have been multiplexed to appear in a single feeder channel for the digital-to-analog system of the present invention. If the digital signals pertaining to different original signals have been processed in the digitizer irrespective of whether they all have similar scaling factors, i.e., similar exponents, of the respective floating point number, the smoothing technique of the present invention can then be applied to the multiplexed, reconverted analog signal before demultiplexing. The envelope straightening, as outlined above and more fully explained below, affects then principally the strongest signal component, and after demultiplexing the individual signals may be A.G.C.-controlled further in individual channels.

It was mentioned above repeatedly that the principal aspect of the investigation of seismic curves is the possibility to very accurately compare the phases of the several waves as received by differently positioned geophones to draw conclusions on the characteristics affecting the propagation of the same wave front to the several different geophones.

One other aspect of the investigation of seismic signals is of great importance, and that is the occurrence of what is called burst-outs. In general, it will be observed that in a seismic run at first the amplitudes are rather large, and then they will become more or less gradually smaller which is what is meant by a declining envelope. These burst-outs are sudden increases in the amplitude of signals as received, and at a rate higher than the gradual declining rate of the envelope in the regular case. In the processing this will appear in a manner that quite possibly the exponents as provided during a particular decommutator de-multiplexing cycle will increase by "one" per decommutator cycle, if we consider that after each decommutator cycle it is the same channel from which we receive signals to be passed onto the same analog output signal channel. There is always one particular original analog input channel in which a burst-out will occur first, and in the digitizer, it was that channel which caused a scaling change. In the present system, this rather rapid change in the exponent due to a burst-out is detected; the mantissas are shifted, the reconstructed wave is built up equally rapidly. The present system is now devised that the gain control tending to provide for a similar envelope throughout, is not so fast as to eliminate the burst-outs which then, after plotting of the several decommutated analog signals, will stand out noticeably. This requires the system to normally operate at less than full scale capabilities at the analog side of the present conversion system, to permit this recognition of burst-outs. Of course, after a while the gain control system of the invention will catch up with the burst-out and bring it down to the envelope level towards which the control system operates.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a block diagram of the preferred embodiment of the present invention; and FIG. 2 illustrates a portion of a curve with several signals related to the curve to facilitate the explanation of the operation of the system shown in FIG. 1.

Proceeding now to the detailed description of the drawings, in FIG. 1 thereof there is shown a block diagram of the preferred embodiment of the present invention. In the upper left hand corner there is written in symbolic notation a binary, floating point number representing, in a particular format, a digital number and having basically three portions. S is the sign bit. Q is the mantissa bits having bits $Q_1$ to $Q_n$, with $Q_1$ being the most significant bit, and $Q_n$ the least significant bit. G is the exponent of the scaling factor $2^{-G}$, and it is presumed that there are four exponent bits in the exponent.

A floating point number of this type is presented by digital channels in that one particular channel provides the sign bits, a plurality of *n*-channels provides the mantissa bits and another plurality of channels, here four, provides the exponent bits. It is now further presumed, which from a standpoint of general application is an arbitrary assumption, that binary fraction point is to the left of the most significant mantissa bit denoted with $Q_1$ so that the exponent is a negative number.

For the discussion of the following, it will be convenient to remember that within this type of representation mantissa bits and exponent code bits are transformable in accordance with the following rules:

$$S.Q\times 2^{-G}=2\times S.Q\times 2^{-(G+1)}$$

By adding binary number 1 to the absolute value of the exponent the mantissa has to be shifted to the left to produce the same number. This can be done without loss of information only, if prior to such transformation the most significant bit $Q_1$ had a bit value 0, so that the highest bit of the number having the value 1 will not be shifted out of the number.

Alternatively, one can write $$S.Q\times 2^{-G}=\frac{S.Q}{2}\times 2^{-(G-1)}$$

if the absolute value of the exponent is reduced by 1, the mantissa will have to be shifted to the right, corresponding to a binary division by two in order to maintain the same number value. If in the unshifted number the least significant bit had value 1, the shifting causes the least significant bit to be lost, unless it is possible to extend the format.

With these preliminary remarks we now proceeed to the description of the block diagram shown in FIG. 1. It is presumed that the data source supplies a floating point number of the type mentioned above in that mantissa bits can be drawn from channel 10 and exponent bits can be drawn from channel 11. These channels 10 and 11 may pertain to a data processing or acquisition device of any kind. For example, they may pertain to a playback unit, reproducing digital data recorded on tape. For explaining the invention fully, it is assumed that these data have been derived from seismic exploration. Moreover, the digital signals have been derived from sampling analog signals produced in measuring instruments, for example geophones. The signals provided by each geophone have been sampled repeatedly and the several geophones are sampled sequentially, so that the digital dates appear in groups, each digital number of a group pertaining to a different analog signal source. The train of digital signals in channels 10 and 11 is thus the result of a multiplexing operation during the data acquisition.

For explaining the invention it may at times be convenient to assume that sequentially provided digital data do not stem from different sources but from the same, which can then be regarded as the special case in which the number K denoting the number of different analog signals represented by multiplexed digital numbers is equal to "one."

The mantissa bits of channel 10 are now set into a register called in the following the A register. It is presumed that this A register has a plurality of stages in excess of the number *n* of mantissa bits. How much in excess will depend on details to be discussed below. Concurrently, the exponent bits of the binary floating point number as derivable from channel 11 are set into a register called the E register. The E register likewise has many stages, as the exponents are expected to have bits; presently this is presumed to be four. A mantissa is set into the A register in a particular manner but subsequently thereto it can be shifted serially in the A register in either one of the two possible directions of shifting. The shifting is controlled by a shifting control 12 also to be described more fully below.

After completion of shifting the mantissa bits, they are transferred in parallel to another register called the M register. The digital number held in the M register is transformed or converted into an analog signal in a digital-to-analog converter 13. The M register is thus the digital input circuit of the *d/a* converter 13. The sign bit S controls the polarity of the output of the converter 13. The analog signal, called *e*, is applied to the input side of a variable gain amplifier 14 having a resistance network 15 in its feedback loop in order to permit gain variations of the amplifier. The resistance network 15 has a plurality of resistors interconnected in a potentiometer or voltage divider configuration with a first series resistor 15–0 being permanently connected in series with a resistor 15–($m$+1) of similar ohmic value R. The junction of resistors 15–0 and 15–($m$+1) defines the feedback path proper to the input of amplifier 14.

A plurality of resistors 15–1 through 15–*m* are selectively and individually connected in parallel to resistor 15–($m$+1) by means of switches 16–1 through 16–*m* respectively. The resistor 15–1 has the same value as R as have the resistors 15–0 and 15–($m$+1). The resistor 15–2 has the value 2R and the resistor 15–*m* has the value $R \cdot 2^{(m-1)}$. The amplifier is now designed so that its gain is equal to the voltage dividing ratio between the resistor 15–0 and the effective resistance of the resistance 15–1 through 15–($m$+1), depending upon closing of the switches.

Whenever all of the switches 16–1 through 16–*m* are open, amplifier 14 has a gain of 2. Whenever all switches are closed, then the amplifier has a gain of 4 with a maximum error of $2^{-(m-1)}$. Whenever switch 16–*i* is closed and none of the others, the gain is $2+2^{-(i-1)}$; for example for $i=1$, switch 16–1 being closed the gain is 3. When switches 16–1 and 16–2 are closed, the gain is 3.5. When switch 16–2 is closed (alone) the gain is 2.5, etc. One can see that the gain is finely adjustable between values 2 and 4, and in steps given by the value $2^{-(m-1)}$, which for $m=8$ for example, is $2^{-7}=0.008$. Thus for an analog signal *e* at the input side of amplifier 14 the output of amplifier 14 may vary between 2*e* and 4*e* (positive or negative).

Amplifier 14 has an output bus 16 which delivers the analog signal to a plurality of gated output amplifiers 17–1, 17–2 through 17–K. It is presumed the train of digital signals applied to the input side of *d/a* converter 13 has resulted from multiplexing so that sequentially provided digital numbers are to be associated with different signal channels. Therefore, the present circuit includes a decommutator control device 18 which distributes the sequentially provided digital data after transformation to an analog signal into the several signal channels, and the amplifiers 17–1 through 17–K pertain to and identify these different, altogether K, output channels. The decommutator control 18 sequentially enables these amplifiers 17–1 through 17–K, one at a time and with cyclic repetition for each amplifier permitting analog signal withdrawal from the output side of the respectively enabled one of these amplifiers.

Each one of these amplifiers 17–1 through 17–K has its own AGC loop for the following reason. The overall purpose of the F and C counters is to apply a finely adjustable multiplying factor common to all different signals being processed and derived from bus 10. Since the output, as derivable from bus 16, can only be approximately correct for the respective highest one of the several multiplexed signals, it follows that signal of lesser amplitude will not be fully amplitude-compensated.

In the circuit as described, up to bus 16 all signals as they are being reconverted to analog signals have been treated similarly. After the decommutation, they are handled individually and the AGC loop of each amplifier 17–1 to 17–K controls the amplitude of each analog signal to the same level as the strongest signal, so that the analog signals of the several channels become readily comparable as to phase. As a representative example it shall be assumed that the decommutator control 18 provides for cyclic enabling of the amplifiers 17–1 through 17–K for a cycle of 1 kc. This means that if an amplifier such as, for example, amplifier 17–1 was enabled for a short period of time (about 1/*k* of a millisecond), it will be enabled again after 1 millisecond, etc. A peak detector 19 is also connected to bus 16 and it determines the highest amplitude value regardless of sign in bus 16 at any time. The detector 19 holds that value at its output for a period of time which is in excess of the commutator operating cycle but which is below, i.e., shorter, than the shortest oscillating period of any signal as it may be represented by the sequential data as pertaining to any individual one of the channels 17–1 through 17–K. Of course, any analog signal value higher than the one held currently in peak detector 19 updates the output of the detector immediately.

An error signal detector 20 compares the output signal of the peak detector 19 with an adjustable reference signal called the set point. The output as provided by error detector 20 is used only as to polarity of the error, not as to amplitude. Thus, the output of detector 20 may be zero, constant positive or constant negative, depending upon existence of and if existing, upon the polarity of a deviation of the output of detector 19 from the set point or reference signal. In case the error is positive, a gate 21 will be enabled; in case the output of the error detector 20 is negative, the gate 22 will be enabled. An oscillator 23 has a frequency corresponding to an oscillating period which depends on the desired speed of the control operations controlled by the oscillations. The oscillator 23 in particular provides individual counting pulses to be applied to a so-called fine resolution counter, F-counter for short.

The pulses from oscillator 23 are applied to the counter for counting up, i.e., for increasing the count number held at anytime in this F-counter when gate 22 is enabled. If gate 21 is enabled, the the number held in the F-counter is gradually reduced. The F-counter is thus bidirectional and the counting process depends on the number of pulses from the oscillator 23 permitted to pass through the respectively opened gate 21 or 22. The F counter further is of the recycling type in either direction; when counting in upward direction and upon reaching the maximum count value, presumed to be here $2^m-1$, the counter is set back to zero and can again progress in upward direction. Conversely, when counting down, upon reaching zero, the counter is set to $2^m-1$ and can proceed downwardly from there. The F counter controls the switches 16–1 through **15–*m* through a switch control circuit 24. In particular, the number held at any instant in the F-counter is translated into open and closed positions of the switches 16–1 through 16–*m*. This control is a direct one. If one assumes that the number in the F-counter is zero, then all switches are open. If the number is 1, the switch 16–1 will close. If the number is 2, the switch 16–2 will close. If the number is 3 the switches 16–1 and 16–2 will be closed, etc. For the highest count number which is the binary number $2^m-1$ all switches 16–1 through 16–*m*** are closed.

Thus the F-counter controls the gain of the amplifier 14 in binary gain steps, the resolution of which is determined by the highest resistance among the resistors 15–1 through **15–*m* as was outlined above. The total gain variation permissible through this control is a 2:1 range corresponding approximately to 6 db. It can thus be seen, that any scaling change in sequentially provided mantissas, corresponding to a 2:1 or 1:2 jump in the resulting analog output for the same gain in amplifier 14, can be smoothed out by fine-step gain changes in amplifier 14** depending upon the average speed of the counter in one direction.

Now we return to the definition of the binary floating number which is provided at the input of the system, and one can see that by shifting the mantissa bits by one step to the left or to the right and by correspondingly subtracting from or adding to the exponent the value 1 this will correspond to a gain change of the signal in bus 16 to double or halve the value prior to the shifting. To state it differently, take a signal $e$ applied to amplifier 14 and this will produce for the lowest gain the value $2e$ in bus 16. The lowest gain corresponds to an F-counter number zero. If now, for example, for reason of the set point setting the F-counter is permitted to count up to the full value causing all switches 16–1 through **16–*m* to close, then the gain of the amplifier 14 has been doubled thereby. Thus the signal now will be 4*e*. Instead, however, one could have left the gain at its lowest value of 2 in the amplifier 14 and one could have shifted the mantissa in the register M by one bit position to the left. This shift would have caused the input of the amplifier 14 to jump from $e$ to $2e$ and the result would again be the signal 4*e* in the bus 16, except that a shifting of the mantissa produces a 6 db jump in the analog output, while the gradual gain change in amplifier 14** produces the same 6 db change gradually.

The F-counter when having reached maximum count number causes all switches 16–1 through **16–*m* to close, now the counter will be reset to zero. Thereupon all switches 16–1 through 16–*m*** will open thus producing a 2:1 gain jump down, precisely equivalent to a shift of the mantissa held in the M register by one position to the right. However, no jump in the analog signal will occur if the opening of all switches is preceded by a mantissa shift to the left before being set into the M register.

It is furthermore apparent that should the F-counter pass through count value zero by operation of a down-counting, then all switches 16–1 through **16–*m* are open at first and with the next down-count pulse the full count number will appear in the F-counter causing all switches 16–1 through 16–*m* to close. No jump in the signal in bus 16** will be produced at that point if this change in the switches from the full open to the full closed position is accompanied by a shift to the right before of the mantissa next to be set into the M register.

In summary: The output of amplifier 14 can be doubled by shifting the mantissa to the left or by recycling the F-counter when counting down, the output of amplifier 14 can be halved, by shifting the mantissa to the left or recycling the F-counter when counting up. The output of amplifier 14 remains the same when the mantissa is shifted to the left as the F-counter recycles when counting up, or when the mantissa is shifted to the right as the F-counter recycles when counting down. Without mantissa shifting and counter recycling, the output of amplifier 14 can be gradually doubled or halved by counter operation alone.

After having explained the influence the F-counter has on the analog signal in bus 16 and after having explained the equivalency of counter recycling and mantissa shifting, it is now necessary to describe the implementation of coupling mantissa shifting and counter recycling steps.

The F-counter has an output channel 26 to which the counter provides a bit when having reached the full count value and resets to zero with the next counting pulse. In the usual binary arithmetic type fashion, this bit is an overflow or carry bit. Conversely, a borrow bit will pass into channel 27 when the counter jumps from the counter number zero to the count number $2^m-1$ during count-down. The carry bits in the line 26 are now passed into a coarse resolution counter in the following called C counter for short. The C counter is also bidirectional and counts carry bits in line 26 in up direction, while a borrow bit in the line 27 causes the C counter to count down.

It is convenient for the moment to describe only stationary conditions, so that we presume the C counter to hold a paricular number. As was mentioned above, the exponent of a digital number is set into the E register when passed from channel 11 to the system. Since we have presumed that there are four exponent bits it follows that the E register has four stages. Within the format chosen, the C counter also has four stages.

The number held in the E register is now compared with the number held in the C counter in a comparator 25. The result does not have to be detected as a digital number but a signal is provided in a line 28 if the number held in the C counter is larger than the exponent held in the E register; a signal will appear in line 29 if the number held in the C counter is smaller than the exponent in the E register; a signal in line 30 will appear when the numbers are equal.

A signal in line 28 has two functions, first it increases the exponent in the E register by "one"; second, the signal triggers shift control 12 to shift a mantissa previously set into the A register by one bit position to the left. This incrementation of the exponent can have two results; the numbers in the E register and the C counter may now be equal, then the signal in line 28 will vanish, and a signal in line 30 will appear instead. This signal in line 30 triggers the transfer of the previously shifted number from the A register to the M register. Alternatively, the signal in line 28 may persist and thus the number in the E register is incremented again, while the mantissa in the A register is shifted by another bit position to the left. It can thus be seen that stepwise exponent incrementation and mantissa shifting persists until equalization of the two numbers compared in device 25 succeeds then resulting in a transfer of the shifted mantissa to the M register.

It will be appreciated that in case the number in the C counter is smaller than the exponent, a signal in line 27 decrements the exponent and triggers the shift control for a mantissa shift to the right. Stepwise decrementation and shifting persist until equalization is obtained and a signal in line 30 controls the transfer of the shifted mantissa to the M register.

As mentioned above, we presume originally to have stationary conditions which means that at first the number held in the E register may be equal to the number held in the C counter. For this case the mantissa will be set into the M register with the same bit positions as provided. Equal values of the exponent and of the number in the C counter can have two causes. One is simply stationary operating conditions. The other cause is that in between two different exponents as received by the E register in direct succession, there was a corresponding change in the C counter. Though basically possible within the overall concept, such a coincidence has a rather low probability.

An imbalance of the two numbers held in the E register and the C counter respectively can arise due to a change in the exponents or due to incrementation or decrementation of the C counter upon F-counter recycling. As individual events the two situations have to be treated independently, even though they are interdependent in a wider sense having to do with the original production of the digital numbers and with the fact that there are two basic feedback loops in the system.

We consider first what occurs if, due to an overflow situation in the F counter, a carry bit is passed into line 26 to increment the number held in the C counter. That incrementation is immediately detected by the comparator 25 and, since now the number in the C counter is larger than the exponent in the E register, the line 28 will be actuated. First, the number in the E register is incremented by 1. It follows logically that thereafter the two numbers held in E register and C counter respectively must be equal again because a single bit in the line 26 can increment the C counter only by one unit. This single pulse in the line 28 is used additionally to trigger the shift control device 12 to shift the number held or to be loaded into the A register by one bit position to the left before that mantissa number set into the M register, the subsequent signal in line 30 transfers the shifted mantissa to the M register, having algebraically doubled in value.

Now we have to consider that the carry pulse in line 26 was produced when all switches 16–1 to **16–*m* reverted from the closed to open position reducing the gain of the amplifier from 4 to 2, thus halving the analog output. Thus, there concurs a doubling of the mantissa of the digital number with a halving of the analog output—no jump occurs. It will be apparent that a borrow pulse in line 27 provides a halving of the mantissa to concur with a doubling of the gain in amplifier 14**. Assuming that subsequently still the same exponents are set sequentially into the E register, then for each such digital number there is first number imbalance, incrementation occurs, the concurrently provided mantissa is shifted in the A register to the left, transferred to the M register and *d/a* converted. Assuming further that the F-counter continued to count up, another overflow will occur after some time and the number in the C counter will again be incremented, now differing for two digits from the exponents. Thus two pulses in line 28 will be produced for each digital number the exponent number will be incremented now by two and the number held in the A register will be shifted two bit positions before being set into the M register. It follows from the foregoing that for a constant exponent, the F-counter controls finely gain steps for a smooth output of amplifier 14, and F-counter controls further through the C counter the entire range scale, such operation being in turn controlled by the error detector 20. The closed loop operation will be described below.

At this point it is important to mention that the rate of the pulses in the line 26 or in the line 27 is considerably slower than the rate with which data are supplied to the system from the channels 10 and 11. Furthermore, the timing of the system is selected in such a manner that the production of a carry or borrow bit in either channel 26 or channel 27 which concurs with a drastic change in the position of all switches **16–*m* through 16–1 does not occur while a particular signal is effectively applied through the decommutator control 18 to one particular channel (17–1 to 17–K). A changeover occurs in a pause in the sequence of the enabling pulses so that any mantissa as it is being set in the M register finds established conditions in the switches 16–1 through 16–*m* as far as their being either all open or all closed is concerned, and any changes in the switches 16–1 etc. occurs in a decommutator pause. In particular, at a time when all switches 16–1 through 16–*m* go from the completely closed to the open position or vice versa, no analog signal is applied to either channel 17–1 through 17–K. In between a change in these switching positions the mantissa of the very next digital signal is first shifted inside of the A register before it is being passed to the M register. And, as developed previously, the number of shifting steps here differs from the number imparted upon the previous mantissa, when all switches 16–1** etc. were still closed.

In the foregoing we have described the cooperation between F-counter, C-counter, fine gain adjustment in amplifier 14 and mantissa shifting, always assuming that the sequentially provided digital signals have similar exponents.

Now we shall describe how for the same number in the C-counter a change in the exponents influences the system. First of all, there is no concurrent change in the fine gain control loop for amplifier 14, except that it operates independently as a loop, depending upon the analog output in line 16 and the set point and the resulting operation of the F-counter. On the other hand, an exponent change affects the mantissa shifting operation, as the number or type of shift control pulses in lines 28 and 29 will be different before and after there is a change in the exponents, and the mantissa will be shifted differently accordingly. That aspect is the same as it is the case before and after a change in the number in the C-counter, and does not have to be repeated here.

However, we have to turn now to the digital signals themselves and what they represent. Reference to FIG. 2 will be helpful. There is shown a sinusoidal signal train 100 sampled during periods 101. The sampled amplitudes such as 102–1, 102–2, 102–3, etc. are depicted as analog signals but they are represented as digital signals sequentially appearing in the above mentioned representation in the channels 10 and 11. We shall disregard for the moment that in between the sample periods 101, other digital signals appear in the channels 10 and 11 representing other sampled analog signals for reasons of multiplex operation in the system assembling the data applied to channels 10 and 11.

This particular analog signal 100 is therefore represented by these sampled blocks 102–1, etc., and are presented in digital form to the input channel 10 of the present system. Normally it can be assumed that the digital variations of the signals occur solely in the mantissa with the exponent of the floating point number representation remaining the same for extensive periods. A shift in that representation, however, occurred if the system which sampled and digitized this analog signal 100 was subjected to a gain change. Such a gain change may have become advisable because the envelope of the sinusoidal signal train may have been found to drop, rather slowly over a period of time, which is long in comparison with the sample period or even compared with the oscillation period of this wave 100. A system of this type and signals of this type produced in an envelope controlled digitizer is more fully disclosed in the copending application mentioned above.

Upon digitizing the analog signal, it is therefore possible that in between a signal block such as, for example, signals 102–2 and 102–3, there occurred a one-step gain change. In the numerical value of the sampled value as expressed by a binary floating point number as a whole no change occurred, but the representation by mantissa and exponent individually now differs. For example, the exponent was increased by "one" and the mantissa bits appeared to be shifted to the left, in comparison with the position the bits would have if the exponent had not changed. If, for example, we call *d*1, *d*2 and *d*3 the digital signals representing the analog quantities 102–1, 102–2 102–3 respectively, then the two signals *d*1 and *d*2 had similar exponents, and it appears, therefore, that the shift control 12 of the present system operates upon their respective mantissas in a similar manner.

We now assume that in the digitizing arrangement which produced the signals *d*1, *d*2, *d*3, etc., there occurred a gain and scaling change, so that the exponent for signal *d*3 is higher by one unit than the exponents for *d*1 and *d*2. It is, therefore, apparent that the mantissa for the number *d*2 as set into the register A differs from the mantissa for the number *d*3 as set next into the A register twofold. First, there is the difference in binary representation of the numerical value of the two amplitudes 102–2 and 102–3 themselves in accordance with the curve 100. In addition, however, the bit position values for the several bits as they are set into the A register differ, because in the digitizing operation which formed the number *d*3 there occurred such a shift (multiplication by 2) in comparison with the position values the bits for the mantissa of number *d*3 would have, if a gain change had not occurred in between the production and digitizing the numbers *d*2 and *d*3.

Thus, upon converting the mantissas of signals *d*2 and *d*3 themselves into analog signals, values 102–1 and 102–2 would appear as plotted in FIG. 2 permitting interpolation of smooth curve 100 as reconstruction of the original sine wave. However, the mantissa of *d*3 when converted into an analog signal would now have twice that value, or 102–3′, thus producing a jump or discontinuity in the trace.

Now we must consider that the two different digital numbers *d*2 and *d*3 have differing exponents, so that the respective mantissas are shifted differently in the A register. For example, if the mantissa for *d*2 was shifted by device 12 (the same as for *d*1 and previous numbers) by two bit positions to the left, and if as stipulated here the exponent for *d*3 is higher by one than the exponent *d*2, the mantissa for *d*3 will be shifted only by one bit position to the left, so that the mantissa of *d*3 as set into the M register appears to be shifted by one bit position to the right in comparison with the position it would have, had the exponent change not occurred. Thus, the mantissa shift produced in the digitizer external to the present system is now reversed or eliminated; and the thus shifted mantissa for *d*3 will, after conversion to an analog signal in the present system, appear as a signal value 102–3.

It can thus be seen that neither an exponent change, nor a recycling of the F-counter, nor a change in the C counter produces a signal jump, i.e., a sudden halving or doubling of the output of amplifier 14 with respect to the particular signal 100.

From the foregoing, one might conclude that the system merely eliminates the change in the digital number representation in the digitizer which forms signals as applied to channels 10 and 11. If this were so, one simply could control the shifting in the A register directly from the E register, but here it has to be observed that changes in the exponent as produced in the digitizer, i.e., the particular formation process of the entire train of digital numbers representing an elongated train of analog signals was done for purposes of properly representing in a given digital format for the mantissa, analog signals, which are varied over a db range of, for example, 80 or thereabouts. The digitizing operation as more fully explained in the above mentioned application was designed so that at all times one could make full use of the entire resolution capabilities for a mantissa having a particular number of bits; this was explained above. Therefore one cannot merely eliminate now again this representation by simply shifting the mantissa for each unit change in the exponent. As was explained above, this would require, for a 15 bit mantissa and a four bit exponent, a shifting range of 31 bits with an analog resolution capability of $2^{31}:1$ which is completely undesirable. Moreover, the analog outputs as derivable from channels 17–1 to 17–K may feed a parallel chart plotter for convenient comparison of the several curves. For this a resolution of, say, $2^9:1$ is sufficient, so that the system may be designed to use only the nine high order mantissa bits. It follows, that a mere elimination of the digitizer introduced signal changes in the mantissa, though necessary for smoothing, the resulting analog signals must be accompanied by addition measures to maintain the fifteen or even nine bit resolution and format. With this we proceed to the description of the complete loop operation.

To eliminate the signal jumps on one hand, the mantissas are shifted with a different shifting for two different components. In order to retain the format chosen for the mantissa, the fine and coarse resolution counters F and C are now provided in a manner which one could describe in the following way: Substantially for each shift step (or different shift step) necessary to be produced in the A register by operation of a change of the exponent in between two digital numbers, there is to result a change in the analog output in the opposite direction but as a gradual gain change. In other words, as far as the output is concerned, any exponent change concurring with a mantissa jump is eliminated at first in the mantissa, but by operation of the fine resolution counter and of the amplifier 14 in closed loop operation that change is reinstated, but subdivided into fine steps. In the end result the mantissa format, and the corresponding scale of the produced analog outputs in any of the channels 17–1 through 17–K are maintained as if the jumps had been retained, but the jumps are actually eliminated and gradually reinstated in fine sequential steps to smooth out the signal as derivable for example from the several output channels.

The key to this operation is the closed loop around amplifier 14, tending to maintain, on the average, zero for the error signal as provided by detector 20, which means that the average peak signals, averaging to occur over periods longer than the oscillations of the analog signals individually, are equal to the set point or reference value fed to the detector 20. The envelope of the strongest signal digitally fed into the system may, for example, gradually decrease over a large range. Thus, as the exponents will stepwise increase from a low to a high value, there will result a control tending to stepwise shift the mantissas to the right. As this, on the long-term average, tends to reduce the peak value input for detector 20, again on the average, the F counter will have longer periods in which it counts up than down, causing the gain of the system to increase twofold: once by counting more up than down in the F counter as stated, and second, by producing more carry than borrow bits, gradually increasing the number in the C counter with a corresponding tendency of shifting the mantissas more to the left. In the overall average, the mantissa will be shifted to the left and to the right equally frequent, if the digitizer scaled all of the signals in a similar manner; otherwise, which can be regarded as the general case, there will be no such balance, and it is not essential that such long term balance be established.

We must now explain the meaning of the set point adjustment in error detector 20 which determines the particular operation of the fine resolution counter. For this it is advisable to consider a particular, extreme case at stable conditions. This case may be that for a certain period of time continuously the highest possible mantissa value, i.e., all one bits for all Q bit positions are being supplied by channel 10. The exponent may be arbitrary but fixed. Let us assume further that there are open loop conditions, separating lines 26 and 27 from the C counter or separating the output of shift control 12 from the A register so that no shifting will occur, and the bits will be positioned to occupy all the respective higher bit positions of the M register. The digital-to-analog converter 13 will produce maximum output (absolute) being, for example E. Now let us assume that any gain exists for the feedback loop 15 or amplifier 14, including the possibility that all switches **16–*l* through 16–*m* are open or all closed, or some are open and some are closed. Then the signal in line 16 will have a value between 2E and 4E. As for the moment we have assumed that the signal does not vary the peak detector output will be stable likewise. If we now assume that the set point is set to that particular value, the F counter will not be operated and maintain its counting state and the system remains stable throughout. If we lower the set point, the output of error detector 20 will become positive, the F-counter will countdown to decrease the gain of amplifier 14 to thereby reduce the output in line 16** and to thereby reduce the error.

Now let us assume that the digital signal sequentially set into the mantissa register is one oscillatory signal train, representing a single sine wave with a maximum amplitude of the maximum value capable of holding by the M register, bearing in mind that the mantissa itself, without sign oscillates between maximum and zero for both half waves. Let us assume further that the set point is set to a value that is equal to $4E\times 0.636$. The output of the peak detector 19 follows the oscillation rather faithfully except that, of course, the peak detector responds also in a full wave rectifier type fashion. Then for such a signal as continuously applied, the output of error detector 20 will for equal periods of time be positive and negative, which means that the F counter will count up and down for similar periods of time so that in the average, there is the same gain but inbetween there are fine gain changes during periods in which the error signal has a particular sign. Thus the output signal of amplifier 14 is not exactly sinusoidal any more, but somewhat flattened. This is a representation of the penalty paid by designing the system so that signal jumps are distributed in time. However, this distortion is acceptable as it is not so severe that it destorts the signal phases, which are of primary interest for comparative studies. It is apparent, that this distortion is lower, the slower the F-counter progresses, i.e., the lower is the frequency of oscillator 23. How low the frequency can be depends entirely on the expected "speed" of envelope change of the digital signals fed into the system, as it is ultimately the F-counter which must keep track of these changes by producing enough carry or borrow bits to offset unidirectional exponent changes, and the loop around amplifier 14 must be fast enough to really successfully produce an average error signal zero.

Still considering the same set point or reference value setting, one can see that the system stabilizes itself. Initially the C counter may hold number zero and the E counter receives the first sequence of exponents. Each one of them will be decremented to zero resulting in a mantissa shift to the right for as many bit positions as the numerical value of each of the exponents. This is turn decreases the analog output *e*, and the output of amplifier 14 drops, so that the error detector 20 goes predominantly negative. F counter starts up over as many counter cycles as are necessary to increase the number held in the C counter (originally zero) until the number of left shifts for which the E register tends to shift the mantissa balances the number of right shifts tended to be produced by the C counter. Balance occurs when the numbers in the F and C counters cause a proper multiplier to be applied to the incoming signal, and the system stabilizes at zero value on the average for the error signal of detector 20. As it was assumed that the mantissas oscillate from maximum value in the M register to zero and that the set point was set to $4E\times 0.636$, as a D.C. signal, the error can never be zero for sequential instants but only on the average.

It may be advisable to shorten the period of initial stabilization, for example, by adjusting the initial content of the C counter to a value close to the anticipated first signal. Alternatively, one could set the very first exponent into both the C counter and the E register. The problem, however, is not critical, as in seismic exploration the first exponents are rather small.

Now let us assume that the set point is lowered below half the previous setting. It then becomes inevitable that the F-counter at first counts down predominantly, necessarily producing a borrow bit in line 27, and the mantissas will be shifted by one bit position to the right. If we now lower the set point to a value of $4.E\times 0.636\times 0.12$ which is 18 db down from the previous setting, altogether three borrow pulses will have been produced in the line 27 before there is again an error of average zero. Thus the number in the C-counter will be smaller by three unit digits than the exponents, under stable operating conditions, and there occur now three serial shifts for each mantissa before it is being shifted in parallel from the A register into the M register, leaving the three highest valued positions in the M register empty.

The maximum amplitude of sequential mantissas (envelope) will be the same so that the output of D/A converter 13 will produce the analog value of $E/8$ instead, which is 18 db down from the signal level discussed previously. As this now was produced by lowering the set point for 18 db, now again the fine gain control loop stabilizes for these conditions without further production of an average error signal other than zero. This now is the regular operating state, leaving the three most significant positions in the M-register unoccupied. This is the portion $M_1$ of the M-register. $M_0$ thus denotes the main portion of the M register used normally, and $M_2$ is a portion beyond the resolution capabilities of the analog output devices, so that the bits in the portion $M_2$ are practically not used.

These open M register positions $M_1$ give the system what is called burst-out capabilities. Here the digital signals may increase rapidly rather than more or less gradually decrease as is normally the case for seismic signals. The normal, gradual envelope decline is regulated as aforedescribed along a "straightened" envelope along $E/8$ peak amplitude for the strongest channel. This permits now temporarily to register burst-outs up to the full scale value of the analog system corresponding to the maximum D/A output E. The key to this is that these burst-outs appear as increasing digital signals with the rate of increase being faster than the system can reduce its overall gain, because F and C counters operate slower. This is desirable because burst-out detection is a significant part of the evaluation of the seismic signals.

Up to this point we have considered in fact only one single channel by limiting of the discussion of the setpoint settings to the effect that it has on a digitized sine-wave and we have in fact considered how the fine resolution counter operates to distribute the jumps in the mantissa so that the corresponding analog signals can be interconnected by the smooth curve without such jumps. We now must consider that there is involved a sequence of different signals by operation of the multiplexing operation of the external digitizer.

It will be understood from the foregoing that the exponents for the several signals to be distributed into the several channels 17–1 through 17–K do not have to be similar as far as sequential digital signals in channels 10 and 11 is concerned. The mantissa shifting, as controlled from device 12, operates in dependence upon the presently valid overall coarse gain control (C-counter) and the individual exponents in the E-register pertaining to the particular mantissa. Furthermore, there may still be discontinuities in the analog signal train in bus 16, which is quite immaterial because that signal as a whole may have no meaning whatever. It is a composite, multiplexed signal and the individual components may be completely unrelated to each other. The principal object is the elimination of discontinuities in each individual one of the multiplexed signals which is accomplished by the means described above.

The overall gain control operates towards a constant envelope of the highest or strongest one of the multiplexed signals at any instant, but the gain jumps which occur for each multiplexed signal train as provided in channels 10 and 11 individually, are individually eliminated. The distribution of these jumps as fine gain changes affects, however, the entire output of amplifier 14, whereby the elimination of the jumps of the stronger signals have a greater influence on all signals than jumps of the weaker ones.

For the case of multiplexed signals there is the limitation that changes in sequential signal values as pertaining to different signals may vary only over a limited and known ratio. In practice, this ratio is rarely higher than 20 db for seismic type signals. Therefore, an additional three bits are provided in the A and M registers (portion M–2) as well as in the converter 13 in order to maintain the desired resolution. As previously mentioned, the A and M registers are void of data under normal A.G.C. conditions in the three high order bits held in portion M–1, in order that a burst-out may be accommodated. The desired resolution under normal conditions is generally nine bits (approximately 0.2%). Thus, the total length of A and M registers is 15 bits. Of course, other sizes can be used under a different set of conditions.

The utilization of multiplexed signals now has the following effect on the analog side of the system. The peak detector 19 will at any time provide to the error signal detector 20 the respective highest value as it is applied to bus 16. If the number of analog channels is very large one can readily see that during a decommutator cycle the highest signals applied to the channel 16 will follow the average envelope behavior of each analog signal.

In case of a single sine wave, the peak detector 19 will follow in fact the envelope of the sine wave itself, i.e., from maximum amplitude down to zero and up again. In case of multiplexing, the several sine waves appear now from standpoint of system control in a random phase relation and the peak detector output will thus vary only between the maximum amplitude of the strongest multiplexed analog signal down to about the maximum of the weakest one, or only very little below thereof. This means that the set point should be somewhat below the value $4E \times 0.636 \times 0.12$, so that the maximum amplitude of the strongest channel still remains at ⅛ maximum analog scale range so as to permit burst-out display as aforedescribed. Thus the input for peak detector 19 varies less than in case of a single sine wave which is beneficial for the operation of the fine resolution counter, as it will now count up or down for not too long periods of time before reversing the counting direction which in turn reduces the frequency of production of carry and borrow pulses in channels 26 and 27 during normal operation when the envelope of the input is actually constant. This in turn reduces the distortion.

It is advisable to discuss the difference of the operation of the fine gain resolutilon control device for a single channel and for a multiplexed channel operation in some greater detail. If in a single channel operation, the analog signal is a single sine wave as represented by sequentially provided digital signals and has a very low frequency in comparison with the cycle frequency of the F-counter for continuous counting in one direction, then it is apparent that the total periods of counting in the F-counter in the same direction goes over extended periods as the error signal retains one polarity quite long. The F-counter may run through several cycles which may result in several carry or borrow bits. The resulting distortion due to such an extensive gain change may be so strong that actually the sine wave is flattened to a trapezoidal pulse. This could be avoided by choosing a low frequency for oscillator 23 to slow the F-counter down. This however deteriorates the control performance for tracking envelope changes in that sine wave.

On the other hand, when there are multiplexed signals, particularly where the number of channels is relatively large such as twenty, thirty, forty, etc., the situation is quite different. After a particular signal applied to the peak detector 19 one can say that there is almost equal probability that the next signal applied thereto corresponding to the next number of the next analog channel, will be higher or will be lower than the previous one, which means that, under stable conditions within each or during at most only a few commutator cycle periods the error signal will most likely reverse its polarity. A decommutator cycle is much shorter than the shortest sine wave oscillation period of any individual analog channel, so that the periods of unidirectional counting in the F-counter are very short.

The loop around amplifier 14 thus operates towards attaining balance with the set point setting while operating only over a very small counting range in either direction, and this in turn means that throughout the operation and within any short period of time, i.e., short in relation to the longest oscillation period of any analog signal digitized and applied to the input of the system, there is an equal probability for counting up and counting down. This in effect reduces the flattening effect imparted upon the waves in each individual analog channel. Of course, the flattening effect will always be there as a side effect of smoothing the mantissa jumps of the input signal of the system.

Considering now the individual output channels and de-multiplexed signals and considering the fact that there are differences in the instantaneous values within each sample cycle for each cycle, there is but one channel and signal for which the output of the peak detector 19 is approximately correct at any instant for a flat envelope. For the other analog channels the control through the F and C counters is not correct as to the particular scale of their respective flat envelopes, but we assume that there is a limit in envelope variations as between the maximum and the minimum analog channel at any instant, and the difference now is being eliminated in each individual channel by an AGC loop which is private to each amplifier 17–1 through 17–K.

What is claimed is:

1. In a system for converting digital numbers in floating point notation each having mantissa, base and exponent, into analog signals, the combination comprising:

input means for sequentially receiving signals representing exponents and mantissas;

means connected to said input means for receiving the digital signals representing a mantissa and converting it into an analog signal, amplifier means connected to be responsive to said analog signal and producing an amplified output, the amplifier means including means for varying the amplifier gain in fine steps each step corresponding to a multiplication of the analog signals by a fraction of said base plus one, the total gain variation covering a range of said base to one;

control means for stepwise changing said gain over said range in either direction, the control means recycling respectively in the opposite direction when reaching either end of said range, in a single step;

means responsive to recycling and to the direction of recycling of said control means to provide for multiplication or division by said base of a mantissa in said digital input circuit;

means connected to said input means and being responsive to a change in the sequential signals representing the exponents to provide for multiplication or division of a mantissa in said digital input circuit; and second control means responsive to a particular characteristics of the output of said amplifier means to operate the first control means to minimize the difference of the envelope of said analog signal from a desired value.

2. In a digital-to-analog converter system, the combination comprising:

first means for receiving digital signals representing respectively the mantissas of a sequence of floating point numbers;

second means for receiving digital signals representing the exponents of said numbers;

third means connected to said first means for converting the mantissas into an analog signal train representative of said mantissas as sequentially received by the first means;

variable gain amplifier means connected to said third means for amplifying the analog signal, the gain of the amplifying means being variable in fine resolution steps in comparison with the average amplitude of the analog signal, the amplifier output varying by 2:1 for respective highest and lowest gain values;

fourth means responsive to the peak analog signal as provided at the output side of the amplifying means and as measured over a predetermined period of time, the fourth means providing an output representative of said peak value;

fifth means responsive to the output of the fourth means and being further responsive to a fixed reference input signal and providing an error signal as between reference input signal and said output of said fourth means;

sixth means defining a source of pulses;

first counter means responsive to the error signal and to the pulses of the source for counting them in a direction determined by the polarity of the error signal, the counter means controlling the gain of the amplifying means in response to the number held in the counter means at any instant, the first counter means providing signals indicative of carry and borrow whenever the first counter recycles after having reached its respective upper and lower counting limit, said limits corresponding to highest and lowest gain of said amplifier means;

a second counting means responsive to said carry and borrow signals and arithmetically accumulating them; and seventh means connected to the second means and said second counter for controlling the relative position of the mantissa received by the first means as they are applied to the third means, in response to the difference between the exponent held in the second means and the number held in the second counting means.

3. In a system as set forth in claim 2, the combination comprising in addition:

a plurality of amplifiers having their inputs connected to the output of said amplifying means;

a decommutator for cyclically enabling the amplifiers of the plurality with only one amplifier at a time being enabled, the decomutator operating in synchronism with sequential reception of digital signals by the first and second means representing a single number, the fourth means averaging the peak signal over a period of time in excess of the decommutator cycle.

4. A system as set forth in claim 2, wherein said fifth means including the reference means being adjusted to provide error signal zero for a peak amplitude detecting signal having a value less than half of the maximum signal said aimplifier means can furnish corresponding to maximum output of the third means.

5. An analog-to-analog conversion method, comprising the steps of, digitizing an analog signal by sequentially providing digital signals representing numbers each having a mantissa and an exponent pertaining to the base of a scaling factor of a number;

selectively multiplying or dividing the mantissas by the base upon detection of a change in the values of the exponents in one or the other direction;

providing a train of analog signals from a sequence of said mantissas after having been selectively multiplied or divided;

controlling the train of analog signals towards constant envelope, first over a limited range by modifying the analog signals of the train themselves, and second by modifying the selectivity of said multiplying or dividing steps, so that on the average the number of multiplying steps approximately equals the number of dividing steps.

6. A system for converting signals representing digital numbers into analog signals, the digital numbers each having a mantissa multiplied by a factor comprised of a base at the power of an exponent, comprising:

first means for receiving the digital signals representing mantissas and converting them into an analog signal;

a variable gain amplifier connected to receive said analog signal to provide an analog output;

second means for varying the analog output in coarse steps by selectively multiplying or dividing said digital signals;

third means for varying the analog output in fine steps by adjusting the gain of said amplifier over a limited range;

fourth means responsive to the envelope of said analog output to control said second means for adjusting the gain of said amplifier over said limited range, the third means including means responsive to the range limits of adjustments to operate said second means for coarse output adjustment; and fifth means responsive to said exponents for modifying the control of the second means by the third means to eliminate discontinuities in said analog output.

7. A system for converting binary floating point numbers having mantissa and exponent into analog signals, comprising:

a digital-to-analog converter for receiving signals representing the mantissa of a floating point number and converting them into an analog signal;

a variable gain amplifier connected to receive said analog signal;

a two-directional counting system having a recycling fine resolution counting stage, and a coarse counting stage operated by overflow in the fine counting stage in either direction;

means operating the gain of said amplifier in response to the counting state of the fine counting stage;

means for coarsely changing the input of said amplifier by arithmetically operating upon the digital number as applied to said digital-to-analog converter, in response to a particular relationship of the counting state of said coarse counting stage and the respective exponents of said floating point numbers; and means for operating said counting system in response to control signals derived from the output side of said amplifier.

8. A system as set forth in claim 7, said last means including a peak detector connected to the output side of said amplifier, reference signal providing means and means connected to the reference means and the peak detector to provide an error signal for controlling said counting system.

9. In a digital-to-analog converter system, the combination comprising:

a digital-to-analog converter having input means for receiving signals representing digital numbers in binary format, and having output means for providing an analog signal representing a digital signal as received by the input means at any instant;

an amplifier having circuit means for adjusting the gain of the amplification on a fine scale between a lowest and a highest gain value, the amplifier producing twice the output for highest gain value in comparison with the output for lowest gain value;

a feedback loop for the amplifier having amplifier output sensing means, reference means, and means for producing an error signal representative of the difference between the amplifier output as provided by the output sensing means and a reference signal as provided by said reference means, the error signal controlling the gain of the amplifier; and means for shifting the position of the digital signals as applied to the input means of the converter corresponding to multiplication or division by two, whenever the gain control for the error signal reaches the highest or the lowest gain level.

10. In a system for converting floating point numbers into analog manifestations, the numbers each being represented by signals defining a mantissa and by signals defining an exponent pertaining to a scaling factor for the mantissa, and wherein the mantissas if converted by themselves into analog signals show discontinuities, the combination comprising:

first means including means (a) for receiving the signals defining a number and further including means (b) for selectively multiplying or dividing the mantissas as received by the means (a) corresponding to an equilization of the exponents of the scaling factors pertaining to sequential numbers, so that the resulting mantissas represent analog signals which can be interpolated by a curve without discontinuities and means (c) for converting the resulting mantissas into analog signals;

second means responsive to a particular characteristic of the analog signal for providing additionally a fine control by causing the amplitude of the analog signal to vary in fine steps, resulting in temporary distortion of the analog signal and providing a coarse control of said analog signal when the fine control reaches the limits of its range; and third means operating concurrently with the coarse control by modifying the multiplication and division by said first means independently from the selectivity of control of said first means in response to the signals representing said exponents.

11. In a system as set forth in claim 10, including means for sequentially providing signals representing mantissas of a multiplexed data train to said first means, and including means for de-multiplexing said analog signals, the latter means including a plurality of amplifiers each having an automatic gain control loop.

12. In a system as set forth in claim 11, wherein the second means responds to the average peak amplitude value of the analog signal, averaged over a period below the shortest oscillation period of any de-multiplexed analog signal, but longer than a de-multiplexing cycle.

13. In a system as set forth in claim 10, said second means including means for providing fine and coarse control of said analog signal towards an envelope at less than half of the full scale for the analog signal, so that on the average the resulting mantissas are below half of the maximum input possible for the second means.

14. In a system for converting floating point numbers into analog manifestations, the numbers each being represented by signals defining a mantissa and by signals defining an exponent pertaining to a scaling factor for the mantissa, and wherein the mantissas if converted by themselves into analog signals show discontinuities, the combination comprising:

first means including means (a) for receiving the signals defining the mantissas, means (b) responsive to the signals as received by the means (a) for providing arithmetic operations on the mantissas so that the resulting mantissas represent analog signals which can be interpolated by a curve without discontinuities, and means (c) for converting the resulting mantissas into analog signals;

second means responsive to a particular characteristic of the analog signal and operating the first means for providing, additionally, a fine control by causing the amplitude of the analog signal to vary in fine steps, and providing a coarse control of said analog signal when a range limit of the fine control has been reached; and third means operating upon said first means concurrently with the coarse control as provided by the second means to provide for additional arithmetic operations on the mantissas to offset the effect of the coarse control as concurrently provided by the second means.

15. In a system for converting sequentially provided digital numbers into analog manifestations, the digital numbers being represented by digital signals which, if converted directly into analog signals, show discontinuities, the combination comprising:

first means including means (a) responsive to particular characteristics of the digital signals representing the discontinuities for providing arithmetic operations on the digital signals so that the resulting digital signals represent analog signals which can be interpolated by a curve without discontinuities further including means (b) for converting the resulting digital signals into analog signals;

second means responsive to a particular characteristic of the analog signals as provided by the second means for providing additionally variations of the analog signal by distorting the amplitude thereof in fine steps to reintroduce the discontinuity as gradually distributed amplitude compression or expansion depending on the direction of the discontinuity; and third means for causing said first means to provide additional arithmetic operations, offsetting the arithmetic operations induced by detected discontinuities to maintain a limited scale range for the digital signals as converted.

16. In combination:

first means for receiving a digital information in floating point notation representing an input signal which has a large amplitude variation range of direct current and low frequency components and a relatively small amplitude variation range of high frequency components;

second means for operating on said input signal to provide an analog output signal containing the high frequency components of said input signal;

third means for operating on said input signal to remove the direct current and low frequency components from said output signal;

fourth means for operating on said input signal to produce said output signal in which high frequency components having one rate of amplitude change are limited to a first preset amplitude level and audio frequency components having another rate of amplitude change are limited to a second preset amplitude level; and fifth means for adjusting the amplitude limiting range of said fourth means so that the limiting rate is less than the rate of amplitude change of the signal variations which are to be limited to said second amplitude level.

17. In a system as in claim 14, the fine control operating in steps at a particular rate causing the analog signal to be distorted by gradually introducing scale change as represented by a change in said scaling factor.

18. A system for converting binary floating point numbers having mantissa and exponent into analog signals, comprising:

first means for receiving the signals representing sequentially provided mantissas and associated exponents and providing an analog signal for each of the mantissas as received;

gain controllable amplifier means connected to receive the analog signal as provided by the first means;

second means connected to the first means to be responsive to a change in sequential exponents to provide arithmetic operation on the respectively associated mantissa for equalizing exponents;

third means responsive to the analog signal and controlling the gain of the amplifier means in the fine steps for maintaining the analog signal in a particular range and at a particular rate, extending over a plurality of the sequentially provided digital signals;

and means for concurrently reversing operation of the second and third means by changing the gain of the amplifier in a fast step by a value equivalent to the concurrent arithmetic operation reversing said arithmetic operation of the said means.

19. In a system as set forth in claim 15, the digital signals representing numbers in floating point notation each including a mantissa and an exponent to a base the means (a) are arithmetically operating upon mantissa and exponent of a number, the means (b) converting the arthimetically operated mantissas into analog signals, the arithmetic operations including multiplication and division by the base, the third means causing a multiplication for each division and vice versa as provided by operation of the means (a).

20. In a system for converting digital signals into analog signals, the digital signals representing floating point numbers respectively having mantissa and exponent to a base;

first means responsive to the signals representing the mantissas and providing analog signals in representation thereof;

second means responsive to signals representing the respectively associated exponents and multiplying or dividing the mantissa by the base in case of a change in value between sequential exponents, to eliminate analog discontinuities; and third means controlling the first means to gradually compress or expand the scale of the analog output in fine steps, over a plurality of sequential floating point numbers as received and equal to the digital scale change as represented by the change in exponents.

References Cited

UNITED STATES PATENTS

| | | | |
|---|---|---|---|
| 3,037,699 | 6/1962 | Lee et al. | 235—154 |
| 3,221,155 | 11/1965 | Birkel | 235—154 |

MAYNARD R. WILBUR, Primary Examiner

M. K. WOLENSKY, Assistant Examiner

U.S. Cl. X.R.

235—197